(12) United States Patent  
Zhang et al.

(10) Patent No.: US 7,830,682 B2  
(45) Date of Patent: Nov. 9, 2010

(54) DC COMPONENT ELIMINATION AT OUTPUT VOLTAGE OF PWM INVERTERS

(75) Inventors: Hong Zhang, Mississauga (CA); Jeremy Eng, Toronto (CA)

(73) Assignee: Honeywell International Inc., Morristown, NJ (US)

( * ) Notice: Subject to any disclaimer, the term of this patent is extended or adjusted under 35 U.S.C. 154(b) by 273 days.

(21) Appl. No.: 11/960,430

(22) Filed: Dec. 19, 2007

(65) Prior Publication Data

US 2009/0161392 A1 Jun. 25, 2009

(51) Int. Cl.  
*H02M 1/12* (2006.01)
(52) U.S. Cl. ........................................ 363/40
(58) Field of Classification Search ............ 363/16, 363/39–44, 47, 95, 97  
See application file for complete search history.

(56) References Cited

U.S. PATENT DOCUMENTS

| | | | | |
|---|---|---|---|---|
| 4,623,854 A * | 11/1986 | Kuraishi | ...... | 333/173 |
| 4,935,859 A * | 6/1990 | Kirchberg et al. | ...... | 363/39 |
| 4,935,860 A * | 6/1990 | Kirchberg et al. | ...... | 363/39 |
| 5,012,400 A * | 4/1991 | Yasuda | ...... | 363/95 |
| 5,253,157 A * | 10/1993 | Severinsky | ...... | 363/98 |
| 5,347,442 A * | 9/1994 | Henmi et al. | ...... | 363/41 |
| 5,373,196 A * | 12/1994 | Faley | ...... | 307/46 |
| 5,650,708 A * | 7/1997 | Sawada et al. | ...... | 318/801 |
| 6,188,183 B1 * | 2/2001 | Greenwood et al. | ...... | 315/307 |
| 6,215,287 B1 * | 4/2001 | Matsushiro et al. | ...... | 323/222 |
| 6,233,163 B1 * | 5/2001 | Lin et al. | ...... | 363/41 |
| 6,295,215 B1 * | 9/2001 | Faria et al. | ...... | 363/37 |
| 6,295,216 B1 * | 9/2001 | Faria et al. | ...... | 363/44 |
| 6,373,735 B2 * | 4/2002 | Usui | ...... | 363/89 |
| 6,404,655 B1 * | 6/2002 | Welches | ...... | 363/41 |
| 7,123,495 B2 * | 10/2006 | Endou et al. | ...... | 363/98 |
| 7,173,394 B2 * | 2/2007 | Yun | ...... | 318/801 |
| 7,176,651 B2 * | 2/2007 | Kifuku et al. | ...... | 318/801 |
| 7,176,652 B2 * | 2/2007 | Wakabayashi et al. | . | 318/400.02 |
| 7,256,507 B2 * | 8/2007 | Endou et al. | ...... | 290/40 A |
| 7,317,292 B2 * | 1/2008 | Iura et al. | ...... | 318/434 |
| 7,324,361 B2 * | 1/2008 | Siri | ...... | 363/95 |
| 7,385,442 B1 * | 6/2008 | Ripley | ...... | 330/9 |
| 2004/0252037 A1 * | 12/2004 | Itoh | ...... | 341/118 |
| 2007/0007969 A1 * | 1/2007 | Dai et al. | ...... | 324/601 |

* cited by examiner

*Primary Examiner*—Gary L Laxton  
*Assistant Examiner*—Yemane Mehari  
(74) *Attorney, Agent, or Firm*—Oral Caglar, Esq.

(57) ABSTRACT

A control system for a PWM inverter may reduce a DC component of an output of the inverter. An output voltage signal may be attenuated with a low-pass filter to produce a signal with a high DC content. A duty cycle of an output of the low pass filter may be determined with a zero-crossing detector. A calculation may be performed to determine a magnitude of a DC offsetting voltage that may offset the DC component of the inverter output. The inverter may be commanded to produce a DC offsetting voltage with an opposite polarity from the DC component of the inverter output. The opposite polarity DC offsetting voltage may effectively cancel the DC component of the inverter output. A monitoring system may employ an alternate system for determining the level of the DC component, thus providing a desirable redundancy to the system.

13 Claims, 6 Drawing Sheets

DC COMPONENT ELIMINATION AT OUTPUT VOLTAGE OF PWM INVERTERS

BACKGROUND OF THE INVENTION

The present invention is in the field of electrical power systems and, more particularly, those power systems which produce direct current (DC) that is converted to alternating current (AC).

Many electrical power systems use a DC power source to supply electrical power to AC loads. An inverter operating with a pulse width modulation (PWM) system is commonly used to convert the DC power to AC power. PWM inverters may be designed to produce three phase power outputs at a desired AC frequency such as 400 hertz (Hz.). But, as is well known, three phase PWM inverters inherently deliver an output that includes a DC component. Presence of an excessive DC component in the output may have an adverse effect on AC loads that may be driven by the output. This may be particularly problematic for power systems in a vehicle such as an aircraft or aerospace vehicle. Consequently, electrical distribution systems that utilize AC power from a PWM inverter are often constructed so that the DC component may be removed through galvanic isolation.

Numerous prior art systems are employed to reduce the adverse effects of such DC components. For example, a transformer may be used to isolate the PWM inverter from the AC loads. Typically such a transformer may be a gapped-core type transformer designed to prevent it from being saturated when exposed to even order harmonics or the DC component. Transformers of this type are expensive. In a power system of an aerospace vehicle, transformers may also add undesirable weight.

Other prior art systems are directed to reducing the DC component. Descriptions of various systems for reducing the DC component are disclosed in US Patent Application Publication No. 2007/0007969A1 and U.S. Pat. No. 5,012,400. The systems of these disclosures provide for an analysis of an output of a PWM inverter to determine a ratio between a positive portion of an AC waveform and a negative portion of the waveform of the output. The determined ratio may be considered to be indicative of an amount of DC component in the output. Various methods are employed to compensate for the thus quantified DC component so that AC power is delivered to a power distribution system with a reduced DC component.

It must be noted that in a typical PWM inverter output, the DC component represents a very small portion of an overall voltage of the output. Typically, even in an uncompensated 115 volt root-mean-square (Vrms) output, the DC component may be one volt or less. Consequently, the measuring systems of the prior art are directed at attempting to accurately quantify a DC voltage value that is only 1% or less of the overall voltage being measured. In the context of such a measurement system, it is difficult to provide an accurate quantification of the DC component.

Present day power distribution systems, particularly those used in aerospace vehicles may require that a DC component is less than 1/10% of the AC voltage. Such rigorous requirements demand measurement and compensation accuracy that is not available from prior art systems. If, for example, quantification of the DC component must be made to an accuracy of +/−0.1V, then it is exceedingly difficult to achieve the requisite accuracy when the overall DC component represents only a small fraction of the measured voltage, i.e. 115 Vrms.

As can be seen, there is a need to provide a system for distributing power from a PWM inverter which precludes a need for an isolation transformer. Additionally there is a need to provide a system for precisely quantifying a DC component in AC power produced by the PWM inverter and then reducing the adverse effects of the DC component. Also, in the context of aerospace applications, there is a need to provide control system redundancy.

SUMMARY OF THE INVENTION

In one aspect of the present invention a method for controlling output of an inverter comprises the steps of determining magnitude of a DC component of the inverter output, and commanding the inverter to produce an offsetting DC voltage that is equal in magnitude to the determined DC component and opposite in polarity from the determined DC component.

In another aspect of the present invention a method for providing redundant inverter output control for an aerospace vehicle comprises the steps of measuring a DC component with a first process in which a duty-cycle of inverter output is determined and measuring the DC component with a second process by subtracting a first attenuated inverter output voltage signal from a second attenuated inverter output signal. In the second process, duty-cycle is not determined. The inverter is commanded to produce an offsetting DC output to cancel the DC component as measured by first process. The inverter output is monitored by sensing the DC component measured by the second process.

In still another aspect of the present invention apparatus for controlling an output of an inverter comprises a device for modifying an output voltage signal of the inverter to increase a ratio of DC voltage to AC voltage in the signal to produce a high DC-content signal, a device for determining a duty-cycle of the high DC-content signal, and a voltage controlling device for commanding the inverter to produce an offsetting DC voltage that reduces the determined duty-cycle variation from 50%.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention may be useful in controlling an output of a PWM inverter in a power distribution system.

More particularly, the present invention may reduce harmful effects of a DC component of the output of the inverter. The present invention may be particularly useful in vehicles such as aircraft which require rigorous and precise control of the DC component. Aerospace vehicles also require that their power distribution systems are constructed with a reduced number of expensive and heavy elements such as transformers.

In contrast to prior-art PWM inverter-based power distribution control systems, which employ DC component isolation with costly and heavy isolation transformers, the present invention may, among other things, provide a reduction of the DC component instead of a transformer-based isolation of the DC component. Additionally, instead of analyzing a full voltage AC waveform to quantify and control a DC component, as in the prior art, the present invention may employ a measuring technique that substantially segregates the DC component from the full waveform so that the DC component may be precisely quantified. An offsetting opposite-polarity DC component that is equal in magnitude to the determined DC component is delivered to the power distribution system and the AC loads are thus provided with AC power that has a reduced DC component.

Figure 1:
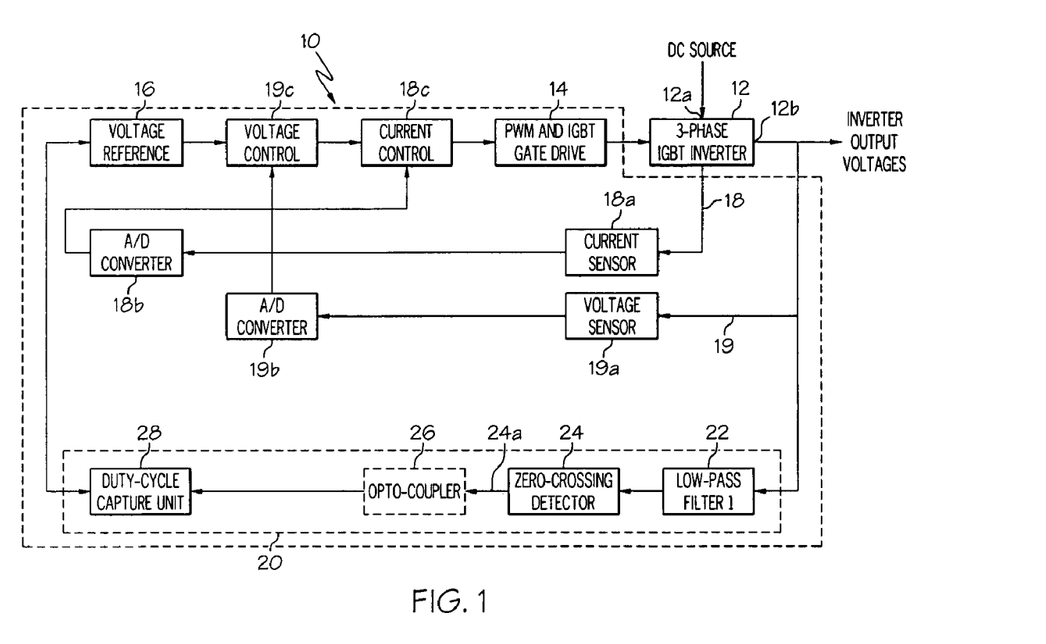
FIG. 1 is a block diagram of a control system for an inverter in accordance with the present invention.

Referring now to FIG. 1, a control system 10 for an inverter 12 is illustrated as a block diagram. The inverter 12 may receive DC power at an input 12a and provide sinusoidal AC power from an output 12b. The inverter 12 may provide AC power at its output 12b with a voltage and with a waveform that are determined by a PWM gate drive 14 and a voltage reference logic block 16. Current control may be provided with a current control feedback loop 18 which may comprise a current sensor 18a, an analog to digital (A/D) converter 18b and a current control logic block 18c. Voltage control may be provided with a voltage control loop 19 which may comprise a voltage sensor 19a, an A/D converter 19b and a voltage control logic block 19c.

A detection system 20 may be interconnected between the inverter output 12b and the voltage reference logic block 16. The detection system 20 may comprise a low-pass filter 22, a zero-crossing detector 24, an optional opto-coupler 26 and a duty-cycle capture unit 28. The detection system 20 may detect and quantify any DC component which may be present within the AC power emerging from the inverter 12. When the AC power is delivered to AC loads (not shown) there may a risk of damage if the AC power includes a DC component. In many power distribution systems, such as those on an aerospace vehicle, a DC component with a voltage greater than +/−0.1 V may be potentially harmful to AC loads such as motors or other devices that may be subject to magnetic saturation. The detection system 20 may detect and quantify the potentially harmful DC component and provide corrective information to the voltage reference logic block 16 to reduce the magnitude of the DC component.

In operation, the detection system may employ the low-pass filter 22 to receive an inverter output voltage signal and to produce a filter output signal in which higher frequency (typically 400 Hz) inputs may be attenuated while the DC inputs may remain unchanged. The filter output signal may be considered a high DC-content signal. Exemplary comparative waveforms may be seen by referring to FIG. 2. A first waveform 202 may represent an output voltage of the inverter 12 of FIG. 1. A second waveform 204 may represent a signal from an output 22a of the low-pass filter 22 of FIG. 1, i.e. a filter output signal. The waveform 202 may comprise an AC voltage of 115 Vrms and a DC voltage of 0.1V. The DC component of 0.1V may be represented by a difference in magnitude of the positive portion 202a and the negative portions 202b. This difference in magnitude within the waveform 202 may be difficult to discern because the 0.1V DC component represents only a small fraction of the overall magnitude of the waveform 202.

Figure 2A:
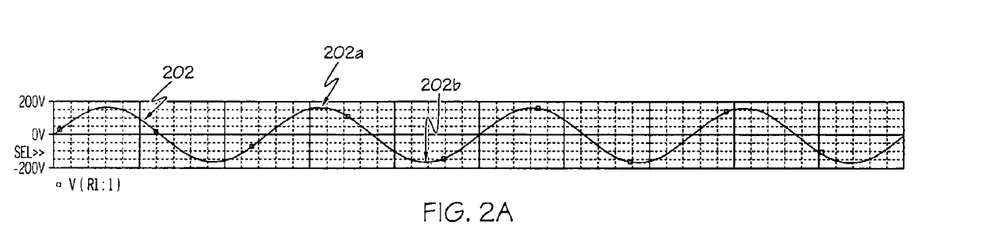
FIG. 2 is a graphical representation of waveforms produced in accordance with the present invention.
Figure 2B:
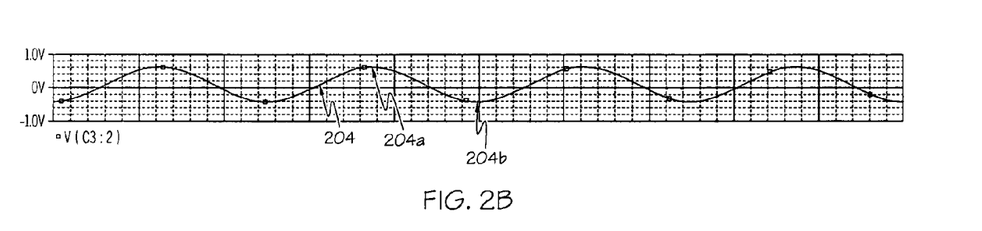

It may be seen that the filter output signal, as represented by the waveform 204 may be attenuated relative to the waveform 202. A positive portion 204a of the waveform 204 may have a magnitude of 0.6V and a negative portion 204b may have a magnitude of 0.4V. In this context, the DC component of the filter output signal (i.e., 0.1V) may be readily discernable because the DC component may comprise a significant portion of the filter output signal.

Referring back now to FIG. 1, it may be seen that the filter output signal may be transmitted to the zero-crossing detector 24. The zero-crossing detector 24 may produce a duty-cycle signal at an output 24a. The duty-cycle signal may be produced with a high degree of accuracy because the zero-crossing detector may receive its input signal, i.e. the filter output signal, with a relatively high ratio of DC voltage to AC voltage.

As is well known by those skilled in the art, the zero-crossing detector 24 may produce a duty-cycle signal that may be expressed as a percentage of time that a periodic input has a positive voltage as compared to a negative voltage. For example a perfectly sinusoidal AC voltage with no DC component will have a duty cycle of exactly 50%.

Now consider the duty cycle that may be present directly at the output 12b of the inverter 12. The inverter output voltage might be positive for almost 50% of a cycle and negative for almost 50% of the cycle. A duty-cycle in such a case would be almost 50%. The duty-cycle would not be exactly 50% if a DC component were present in the inverter output voltage. For example if the DC component were 0.1V, the duty-cycle might be 49.9%.

But, when the zero-crossing detector 24 is located downstream of the low-pass filter 22, in accordance with the present invention, the filter output signal may have a relatively large DC component. In the example described above with respect to FIG. 2, the duty cycle signal produced by the zero-crossing detector 24 is 44%. Thus, the exemplary DC component of 0.1V may correspond with a duty-cycle delta of 6% (i.e. 50% minus 44%).

The duty-cycle signal produced by the zero-crossing detector 24 may be transmitted through the optional opto-coupler 26 to the duty-cycle capture unit 28. The duty-cycle capture 28 unit may be a conventional portion of a digital signal processor (DSP). A typical one of the duty-cycle capture units 28 may be able to detect duty-cycle variations as low as 0.0021% (for example a 16-bit capture unit using a 18.75 MHz clock to detect duty cycle change on a 400 Hz fundamental, corresponds to a resolution of 0.00213%). Thus the duty-cycle capture unit 28 may accurately detect a 6% duty cycle variation as described in the above example.

The duty-capture unit 28 may generate an offset voltage signal that may be transmitted to the voltage reference 16. The offset voltage signal may be utilized by the voltage reference 16 to produce a DC offset reference that may be equal in magnitude to the detected DC component but opposite in polarity. The DC offset reference may be transmitted through the voltage control 19c so that the inverter 12 may be commanded to produce an offsetting DC component equal to the DC offset reference. When the inverter 12 produces such an offsetting DC component, the effect may be to virtually eliminate the detected DC component or at least reduce the DC component to a tolerable, i.e., non-harmful, level.

Figure 3:
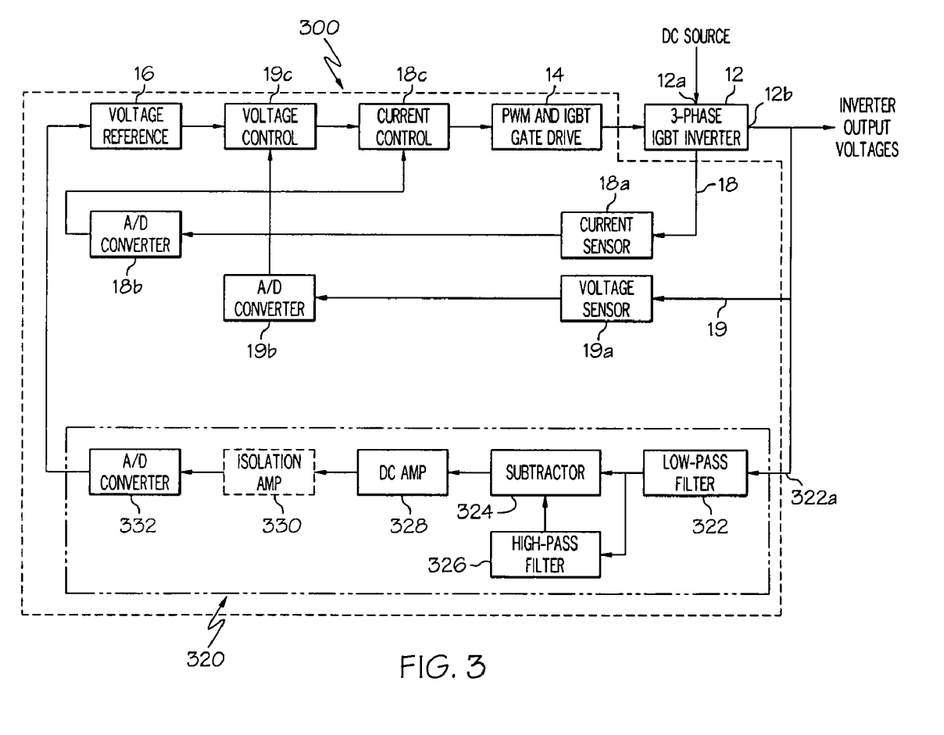
FIG. 3 is a block diagram of a control system for an inverter in accordance with the present invention.

Referring now to FIG. 3, another embodiment of the present invention, a control system 300, is illustrated in block diagram form. The control system 300 may comprise all of the elements of the control system 10 of FIG. 1 except for the detection system 20. The control system 300 may comprise a detection system 320.

The detection system 320 may comprise a low-pass filter 322 connected to the inverter output 12b and to a subtractor 324 and a high-pass filter 326. The high-pass filter 326 may also be interconnected with the subtractor 324. The subtractor 324 may be interconnected with a DC amplifier 328. The DC amplifier 328 may be interconnected to the voltage reference logic block 16 through a conventional isolation amplifier 330 and an A/D converter 332.

In operation, the inverter output voltage signal may be applied to an input 322a of the low pass filter 322. The low-pass filter 322 may produce a low-pass filter signal in which AC voltage is attenuated in the same manner as described above with respect to the detection unit 20 of FIG. 1. The low-pass filter output signal may be transmitted to the subtractor 324 and to the high-pass filter 326. The high-pass filter 326 may produce a high-pass filter output signal in which DC voltage is attenuated. The subtractor 324 may subtract total voltage received from the low-pass filter 322 from total voltage received from the high-pass filter 326. Thus the subtractor 324 may produce a subtractor output that may be representative of the DC component in the inverter output. The DC amplifier 328 may amplify the subtractor output and provide an amplified DC voltage signal to the A/D converter 332. The A/D converter may produce a digital representation of the amplified DC voltage signal and transmit a digital DC voltage signal to the voltage reference logic block 16. The voltage reference logic block 16 may then provide an offsetting voltage command to the inverter 12 so that the DC component of the output voltage of the inverter 12 may be virtually eliminated.

Figure 4:
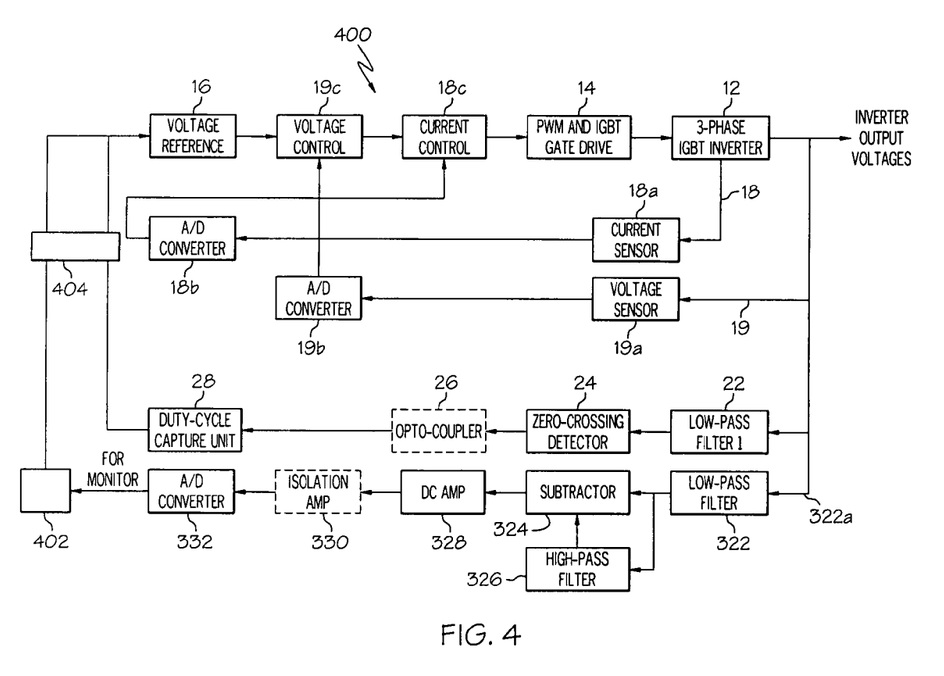
FIG. 4 is a block diagram of a control system for an inverter in accordance with the present invention.

Referring now to FIG. 4, there may be seen another embodiment of the present invention, a control system 400. The control system 400 may comprise all of the elements of the control system 10 and the control system 300. The control system 400 may differ from the control systems 10 and 300 in that the A/D converter 332 may not be directly interconnected with the voltage reference logic block 16. Instead, the A/D converter 332 and the duty-cycle capture unit 28 may be interconnected with a monitoring system 402 and selectively interconnected, through a switch 404, with the voltage reference logic block 16.

The control system 400 may be particularly useful for controlling power in an aircraft or other aerospace vehicle. In such vehicles, redundancy of control systems is of paramount importance. The control system 400 may provide the desired redundancy. In a steady state operation, the detection system 20 may determine an amount of offsetting voltage that is required at the inverter 12. The detection system 300 may simply perform a monitoring function. In the event of a failure of the detection system 20, the detection system 300 may be switched to become a controlling system instead of being just a monitoring system. A process for DC component measurement within the system 300 is different from a measuring process employed within the detection system 20. Use of dissimilar techniques is desirable in the context of providing redundancy in aerospace vehicles.

Figure 5:
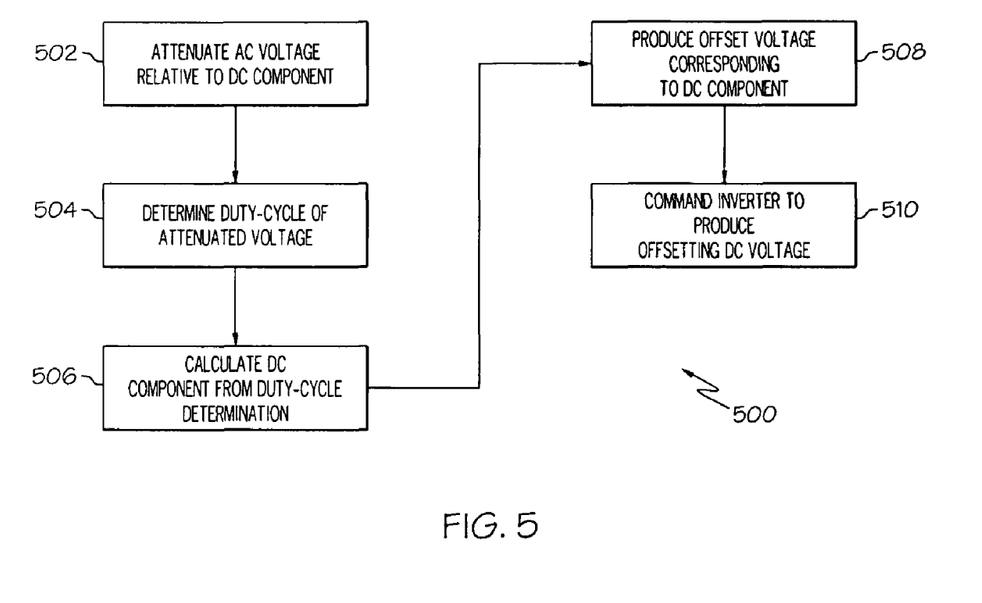
FIG. 5 is a flow chart of a method for controlling an inverter in accordance with the present invention.

In one embodiment of the present invention, a method is provided for controlling power distribution from an inverter so that AC power is provided with a minimal DC component. In that regard the method may be understood by referring to FIG. 5. In FIG. 5, a flow chart portrays various aspects of an inventive method 500.

In a step 502, an AC component of an output voltage signal of an inverter (e.g. the inverter 12) may be attenuated relative to a DC component of the output voltage signal. The step 502 may be performed by applying the output voltage signal to an input of a low-pass filter (e.g. the low-pass filter 22). In a step 504, a duty-cycle of the attenuated output voltage signal may be determined (e.g. with the zero-crossing detector 24). In the step 504 a duty-cycle signal may be produced and transmitted to a duty-cycle capture unit (e.g. the duty-cycle capture unit 28). In a step 506, magnitude of the DC component of the output voltage signal may be calculated (e.g. with the duty-cycle capture unit 28). In a step 508, an offsetting DC voltage signal may be produced with a magnitude equal to the calculated DC component and with a polarity opposite to the calculated DC component. The step 508 may be performed in the voltage reference logic block 16. In a step 510 the inverter may be commanded to produce the offsetting DC voltage at its output, thereby effectively eliminating a DC component from its output voltage.

Figure 6:
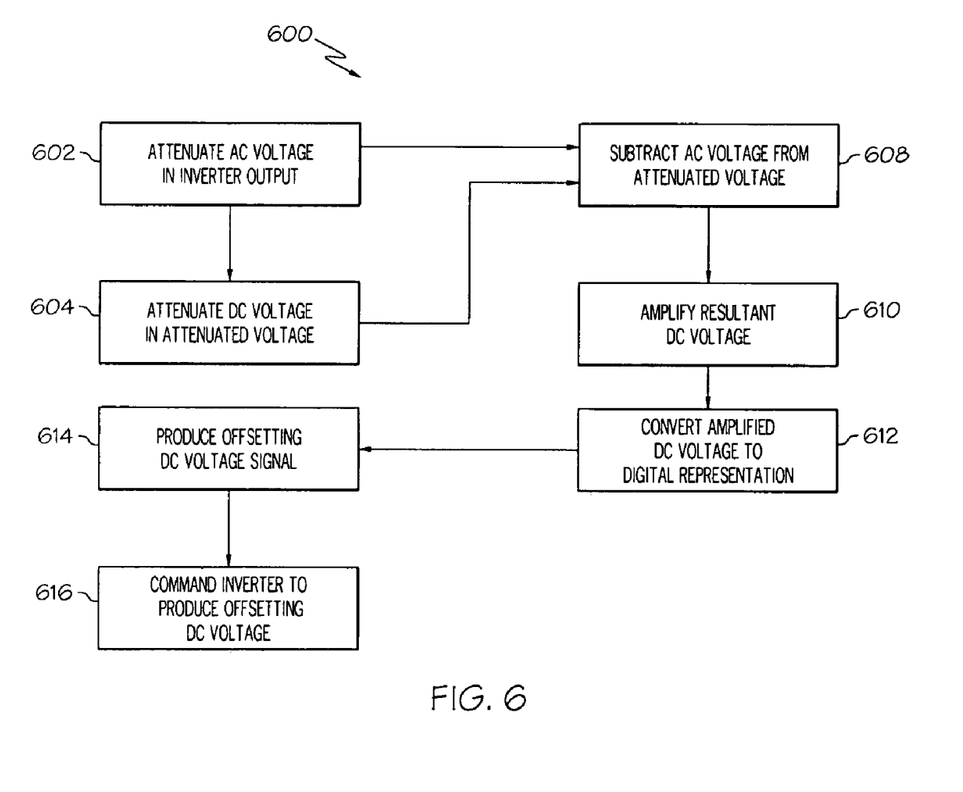
FIG. 6 is a flow chart of a method for controlling an inverter in accordance with the present invention.

In another embodiment of the present invention, another method is provided for controlling power distribution from an inverter so that AC power is provided with a minimal DC component. In that regard the method may be understood by referring to FIG. 6. In FIG. 6, a flow chart portrays various aspects of an inventive method 600.

In a step 602 an AC component of an output voltage signal of an inverter (e.g. the inverter 12) may be attenuated relative to a DC component of the output voltage signal. The step 602 may be performed by applying the output voltage signal to an input of a low-pass filter (e.g. the low-pass filter 322). In a step 604, DC voltage may be attenuated in the low-pass filter output signal. The step 604 may be performed by applying an output signal from the low-pass filter to a high-pass filter (e.g. the high-pass filter 326).

In a step 608, signals produced in the steps 602 and 604 may be subtracted from one another (e.g. with the subtractor 324) to produce a DC component signal. In a step 610, the DC component signal may be amplified (e.g. with the DC amplifier 328). In a step 612, the amplified DC component signal may be converted to a digital representation of the DC component (e.g. with the A/D converter 332).

In a step 614, an offsetting DC voltage signal may be produced with a magnitude equal to the calculated DC component and with a polarity opposite to the calculated DC component (e.g. within the voltage reference logic block 16). In a step 616 the inverter may be commanded to produce the offsetting DC voltage at its output, thereby effectively eliminating any DC component from its output voltage.

It should be understood, of course, that the foregoing relates to exemplary embodiments of the invention and that modifications may be made without departing from the spirit and scope of the invention as set forth in the following claims.

We claim:

1. A method for controlling output of an inverter comprising the steps of:
    determining magnitude of a DC component of the inverter output by applying the output of the inverter to an input of a low-pass filter;
    commanding the inverter to produce an offsetting DC voltage that is equal in magnitude to the determined DC component and opposite in polarity from the determined DC component semiconductor
    modifying an output voltage signal of the inverter to increase a ratio of DC voltage to AC voltage in the signal thereby producing a high DC-content signal;
    determining a duty-cycle of the high DC-content signal;

determining a difference between the determined duty-cycle and a 50% duty-cycle; and calculating a magnitude of DC voltage that corresponds to a deviation of the duty-cycle from 50%.

2. The method of claim 1 wherein the step of determining the duty-cycle is performed with a zero-crossing detector.

3. The method of claim 1 comprising the further steps of:

calculating a DC offsetting voltage that is equal in magnitude to the DC component of the inverter output.

4. The method of claim 1 comprising the further steps of:

monitoring the output of the inverter to assure that the DC component of the output is at or below a predetermined tolerable level.

5. The method of claim 4 wherein the DC component is maintained at level that corresponds to no more than 0.1V for 115 Vrms.

6. A method for providing redundant inverter output control for an aerospace vehicle comprising:

measuring a DC component with a first process in which a duty-cycle of inverter output is determined;

measuring the DC component with a second process by subtracting a first attenuated inverter output voltage signal from a second attenuated inverter output signal, said second process performed without determining a duty-cycle;

commanding the inverter to produce an offsetting DC output to cancel the DC component as measured by one of the first process and the second process, wherein a switch is used to select the first process or the second process;

monitoring the inverter output by sensing the DC component measured by the second process.

7. The method of claim 6 wherein the first process comprises the steps of:

modifying an output voltage signal of the inverter to increase a ratio of DC voltage to AC voltage in the signal thereby producing a high DC-content signal with a low-pass filter; and determining a duty-cycle of the high DC-content signal.

8. The method of claim 7 comprising the further steps of:

determining a differential between the determined duty-cycle and a 50% duty-cycle; and calculating a magnitude of DC voltage that corresponds to the duty-cycle differential.

9. The method of claim 6 comprising the further steps of selectively performing the commanding step to produce an offsetting DC output to cancel the DC component as measured by second process in the event of failure of the first measuring process.

10. Apparatus for controlling a DC component of an output of an inverter comprising:

a device for modifying an output voltage signal of the inverter to increase a ratio of DC voltage to AC voltage in the signal to produce a high DC-content signal;

a device for determining a duty-cycle of the high DC-content signal;

a device for generating an offset voltage signal that is used to produce a DC offset voltage which is equal to the magnitude of the DC component, but opposite in polarity;

a voltage controlling device for commanding the inverter to produce the DC offset voltage that reduces the determined duty-cycle variation from 50%;

a second low-pass filter interconnected with the inverter output;

a high-pass filter interconnected with the second low-pass filter; and a subtractor interconnected with the second low-pass filter and the high-pass filter, whereby the subtractor produces a signal that corresponds to the DC component of the inverter output, wherein the device for producing the high DC-content signal is a zero-crossing detector.

11. The apparatus of claim 10 which further comprises;

a DC amplifier interconnected with the subtractor;

an A/D converter interconnected with the DC amplifier;

a monitor interconnected with the A/D converter; and wherein the monitor determines whether the DC content of the output is at or below a predetermined level.

12. The apparatus of claim 11 which further comprises a selective interconnection between the subtractor and the voltage controlling device so that an output signal from the subtractor may be used to determine the offsetting DC voltage.

13. The apparatus of claim 12 wherein:

the control system comprises an aerospace vehicle inverter control system;

the control system comprises a first and a second detection system;

the first detection system comprises the device for determining duty-cycle;

the second detection system comprises the subtractor; and the first and second detection systems comprise a redundant detection system for the aerospace vehicle.

* * * * *